United States Patent [19]

Heung

[11] Patent Number: 5,312,597
[45] Date of Patent: May 17, 1994

[54] APPARATUS FOR SEPARATING AND RECOVERING HYDROGEN ISOTOPES

[75] Inventor: Leung K. Heung, Aiken, S.C.

[73] Assignee: The United States of America as represented by the United States Department of Energy, Washington, D.C.

[21] Appl. No.: 967,491

[22] Filed: Oct. 28, 1992

[51] Int. Cl.⁵ .................... G21C 1/00; G21C 1/06
[52] U.S. Cl. .................... 422/159; 422/160; 422/173; 423/DIG. 7; 976/DIG. 377
[58] Field of Search .............. 422/159, 168, 173, 177, 422/178; 165/160, 163; 55/208; 423/DIG. 7, 647.7, 658.2; 976/DIG. 377

[56] References Cited

U.S. PATENT DOCUMENTS

| | | | |
|---|---|---|---|
| 4,133,762 | 1/1979 | Visceglia et al. | 210/186 |
| 4,336,226 | 6/1982 | Christensen | 422/159 |
| 4,859,427 | 8/1989 | Konishi et al. | 422/159 |
| 4,872,503 | 10/1989 | Marriner | 165/163 |

Primary Examiner—Robert J. Warden
Assistant Examiner—Krisanne M. Thornton
Attorney, Agent, or Firm—Brian R. Tumm; Harold M. Dixon; William R. Moser

[57] ABSTRACT

An apparatus for recovering hydrogen and separating its isotopes. The apparatus includes a housing bearing at least a fluid inlet and a fluid outlet. A baffle is disposed within the housing, attached thereto by a bracket. A hollow conduit is coiled about the baffle, in spaced relation to the baffle and the housing. The coiled conduit is at least partially filled with a hydride. The hydride can be heated to a high temperature and cooled to a low temperature quickly by circulating a heat transfer fluid in the housing. The spacing between the baffle and the housing maximizes the heat exchange rate between the fluid in the housing and the hydride in the conduit. The apparatus can be used to recover hydrogen isotopes (protium, deuterium and tritium) from gaseous mixtures, or to separate hydrogen isotopes from each other.

8 Claims, 2 Drawing Sheets

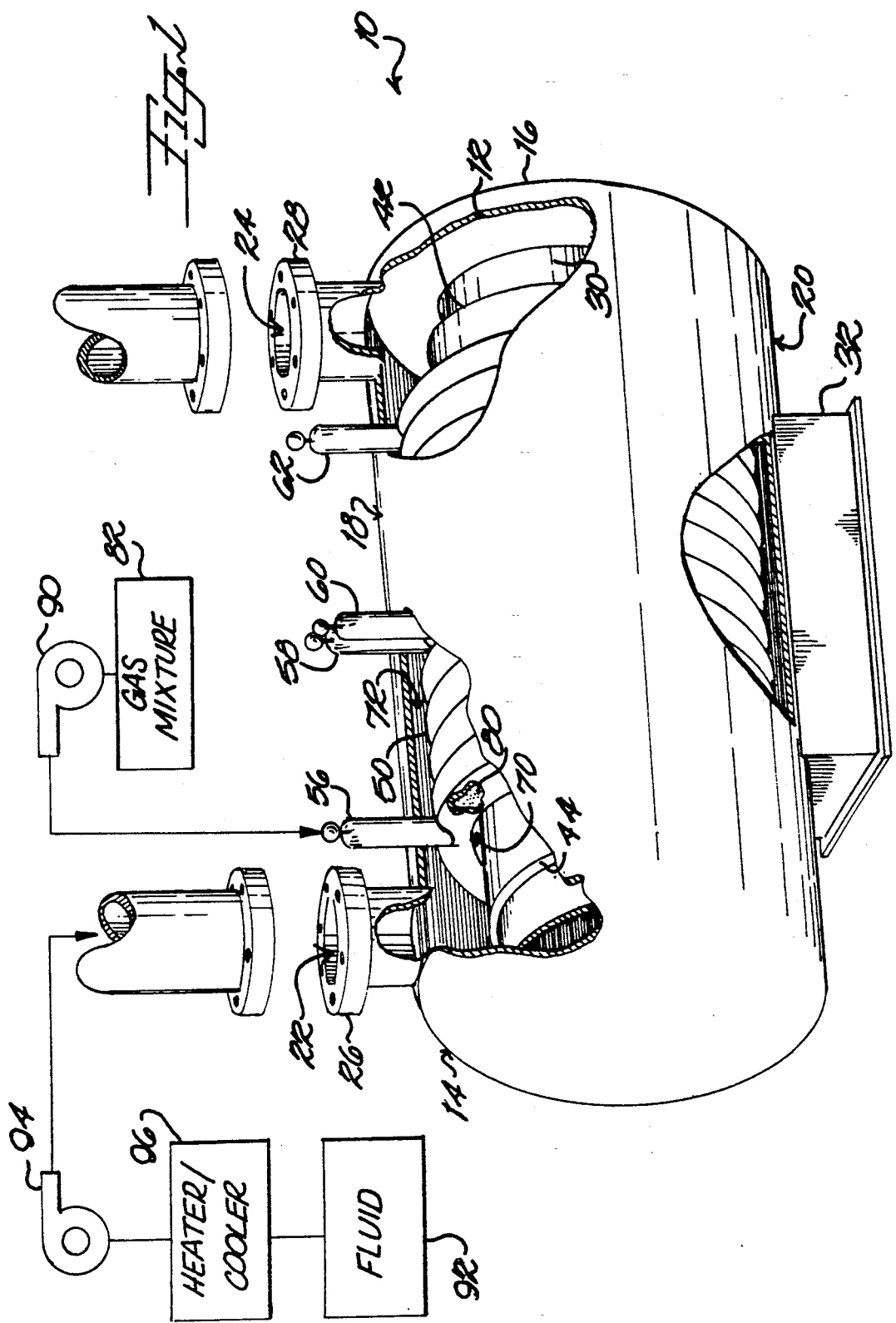

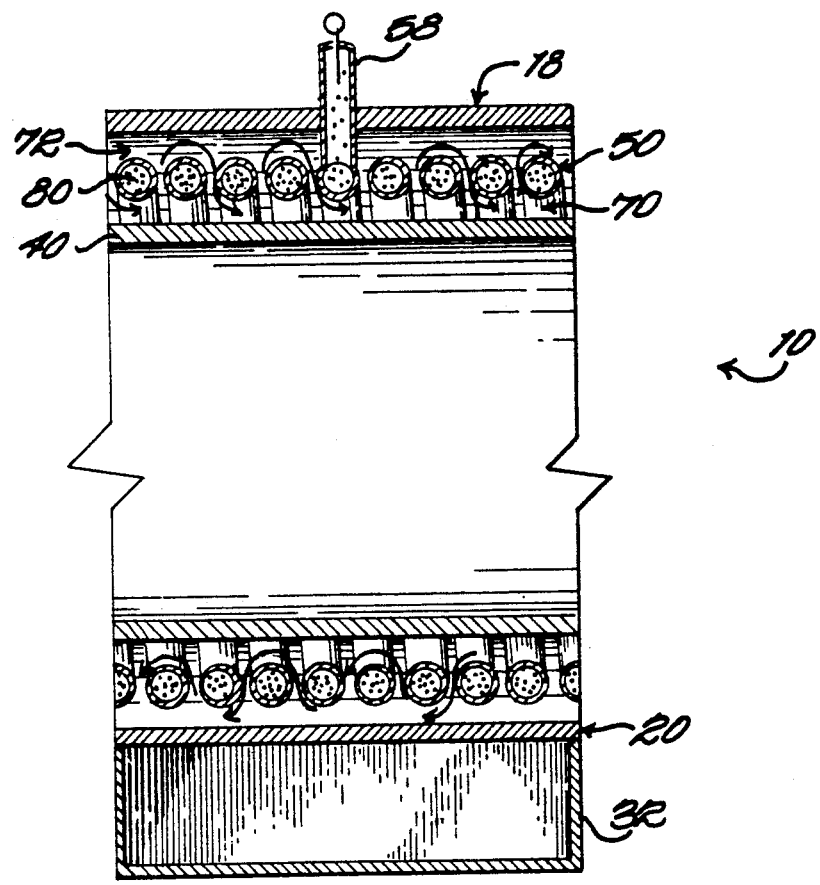

APPARATUS FOR SEPARATING AND RECOVERING HYDROGEN ISOTOPES

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to the recovery of hydrogen and the separation of hydrogen isotopes. In particular, the present invention relates to a hydride absorption/desorption apparatus for the recovery of hydrogen and the separation of the isotopes of hydrogen.

2. Discussion of Background

Processes for the separation of hydrogen isotopes often rely on hydrogen-absorbing materials (hydrides) for the recovery, storage and supply of the isotopes. Hydrides are capable of absorbing large amounts of hydrogen which can then be desorbed under the appropriate temperature and pressure conditions. They are selective in that they only absorb hydrogen, and also differentially absorb the three isotopes of hydrogen (protium, deuterium, and tritium).

When hydrogen contacts a hydride, the temperature of the hydride rises as it absorbs hydrogen in an exothermic reaction. Since the hydrogen equilibrium pressure increases exponentially with increasing temperature, hydrogen absorption decreases with increasing temperature. Absorption ceases when the partial pressure of hydrogen is equal to the equilibrium pressure. Therefore, the hydride must be cooled to maintain the absorption process. To release hydrogen, the reaction is reversed by heating the hydride. The faster the hydride is cooled and heated, the faster the hydrogen is absorbed and released, respectively.

Known hydrides include pure metals (Mg, Ti, V, Nb, Pt, Pd, and so forth), alloys (the La-, Ti-, and Co- alloys, rare earth-Ni alloys), and various hydride-containing compositions. The capacity of a particular material to absorb or release hydrogen depends on the temperature, the external hydrogen gas pressure, and the surface area of the material. To maximize surface area and absorption/desorption efficiency, the hydride is often supplied in the form of small-grained particles or pellets.

Typical hydrogen separation apparatus includes a column at least partially filled with a hydride. A hydrogen-containing gas mixture is flowed through the column to separate hydrogen from the mixture; the column is heated to recover the hydrogen. A plurality of columns, arranged in "series" or "parallel," may be provided to increase the efficiency of the process. For example, channels might be machined into an aluminum or stainless steel block, filled with a hydride, and covered by a plate welded thereto. Hydride-containing columns may be arranged in parallel within a sealed housing, as in the apparatus described by Konishi, et al. (U.S. Pat. No. 4,859,427). Heat is supplied by applying an electric current to heating coils disposed within the housing. Hydrogen or a hydrogen-containing mixture enters the housing through an inlet and portions thereof are diverted to flow through the individual columns.

Known designs of this type generally use straight columns. Since the efficiency of the absorption/desorption process depends in part on how rapidly the column is heated and cooled; the faster the cooling and heating, the higher the efficiency. The cooling and heating rate increases with the column surface area and the heat transfer efficiency between the column surface and the heat transfer medium. The heat transfer efficiency in turn depends on the flow pattern of the heat transfer medium over the external surface of the column. The column surface area is sometimes increased by the use of multiple columns. Designs using multiple columns typically contain a large number of fittings, seams, welds, or couplings. In many cases, it is difficult to examine these to assure the structural strength and integrity of the apparatus. There is a need for an efficient hydrogen isotope separation apparatus having a large column surface area with a minimum of welds or other couplings and a high heat transfer efficiency.

SUMMARY OF THE INVENTION

According to its major aspects and broadly stated, the present invention is an apparatus for separating a hydrogen isotope from a gaseous mixture or from a mixture of hydrogen isotopes by controlled absorption and desorption using hydride particles. A baffle is disposed within a housing, attached thereto by a bracket. A hollow conduit with an interior, an exterior, one or more inlets, and one or more outlets is coiled about the baffle, in spaced relation to the baffle and the housing so as to confine and accelerate the heat transfer fluid to create turbulent flow over the exterior of the coiled conduit. The coiled conduit is dimensioned for holding a quantity of hydride particles.

Depending on the type of hydride particles placed in the conduit, the apparatus may be used to recover hydrogen from a hydrogen-containing gaseous mixture or to separate hydrogen isotopes (protium, deuterium and tritium) from each other. To recover hydrogen from a gaseous mixture, a low pressure hydride such as palladium, uranium or titanium is placed in the conduit. To separate hydrogen isotopes, a hydride with strong isotopic effects, such as palladium, vanadium or a lanthanum-nickel-aluminum alloy, is used.

The apparatus is operated in a temperature cycling process, where each cycle consists of a cooling, or separation, phase and a heating, or regeneration, phase. In the cooling phase, the hydride is cooled to a low temperature by circulating a low temperature fluid over the exterior of the coil. In the heating phase, the hydride is heated to a high temperature by circulating a high temperature fluid over the coil. The faster the temperature is cycled, the better the separation efficiency of the apparatus.

To separate hydrogen from a gaseous mixture, the mixture is pumped through the conduit in the cooling phase of the separation cycle. At least a portion, and preferably most of the hydrogen in the mixture is absorbed by the hydride, and largely hydrogen-free gas is withdrawn from the coiled conduit at the outlet. In the heating phase of the cycle, the hydrogen is desorbed from the hydride and collected at the outlet.

To separate hydrogen isotopes from each other, one of two types of hydride is used. The first type, such as palladium, absorbs the lighter hydrogen isotopes better than the heavier isotopes; that is, it absorbs protium better than deuterium and tritium, and deuterium better than tritium. The second type of hydride, such as vanadium, absorbs the heavier isotopes better than the lighter isotopes, that is, it absorbs tritium better than deuterium and protium, and deuterium better than protium.

An important feature of the present invention is the hollow coiled conduit, disposed about the cylindrical baffle and at least partially filled with a hydride. The coiled conduit can contain no seams or welds along its length, as opposed to a series of parallel conduits, but has the same efficient use of space that parallel conduits have compared to a single long conduit. The conduit is dimensioned for holding a quantity of hydride particles, but the particular dimensions and configuration of the coiled conduit depend on the dimensions of the cylindrical baffle and the housing. The inside diameter and length of the coiled conduit also affect the gas flow characteristics. The optimum dimensions of the coiled conduit are best determined by a modest degree of computation and experiment for each particular apparatus. The heat energy exchange between fluid and hydride is enhanced by the combination of the cylindrical baffle and the coiled conduit. These features confine or restrict the fluid and accelerate its velocity, causing turbulent flow for better heat transfer.

Another important feature of the present invention is the combination of the housing, the cylindrical baffle and the exterior of the coiled conduit. During absorption, the hydride temperature is cooled by flowing a fluid at low temperature over the coiled conduit. When the fluid is pumped into the housing inlet, it is diverted by the cylindrical baffle to flow over the coiled conduit to the housing outlet. Fluid flow is largely confined to the annular region between the cylindrical baffle and the housing, where turbulent flow facilitates efficient heat transfer from the hydride and the coiled conduit to the fluid. The spacing between the coiled conduit and the cylindrical baffle, and the spacing between the coiled conduit and the housing, are preferably selected to induce turbulent flow for efficient heat transfer, but not to be too restrictive and cause too much pressure drop and loss of flow. The optimum spacings depend on the particular dimensions of the components of the apparatus.

A further feature of the present invention is the fluid. The fluid is preferably nitrogen, but may be any convenient stable gas (including the inert gases) or liquid, which does not react with the process gas or the apparatus materials, and can efficiently transfer heat in the desired operating temperature range. The fluid temperature can be regulated so as to be a higher or lower temperature than the hydride temperature. The larger the temperature difference between the fluid temperature and the hydride temperature, the better heat transfer and the more effective the absorption or desorption process.

Still another feature of the present invention is the hydride. Depending on the choice of hydride, the apparatus can be used to separate hydrogen—or a particular isotope of hydrogen—from a gaseous mixture containing hydrogen, or to separate an isotope of hydrogen from a mixture of hydrogen isotopes. To maximize the efficiency of hydrogen absorption/desorption, the surface area of the hydride is maximized by supplying the hydride in the form of small, porous particles. Preferably, the hydride is a granular, dimensionally-stable metal hydride or hydride composition such as the stable hydrogen-absorbing composition described in commonly assigned and recently issued U.S. Pat. No. 5,248,649 titled Palladium/Kieselguhr Composition and Method, described below in the Detailed Description of a Preferred Embodiment. With this composition, the apparatus effectively separates >99.9 vol. % deuterium (D) from a process gas containing 50 vol. % each protium (H) and deuterium, and >99.9 vol. % $H_2$ from a mixture containing 20 vol. % $H_2$ and 80 vol. % other gases such as $N_2$.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a partially cut-away perspective view of an apparatus according to a preferred embodiment of the present invention with pumps and temperature regulating devices shown schematically; and FIG. 2 is a cross-sectional view of a portion of an apparatus according to a preferred embodiment of the present invention.

DETAILED DESCRIPTION OF A PREFERRED EMBODIMENT

Referring now to FIG. 1, there is shown a partially cut-away, perspective view of an apparatus according to a preferred embodiment of the present invention. Apparatus 10 includes housing 12 having first end 14, second end 16, upper surface 18 and lower surface 20. Upper surface 18 bears fluid inlet 22 and fluid outlet 24 at ends 14 and 16, respectively. Inlet 22 and outlet 24 may bear flanges 26, 28, respectively. Bracket 30 is attached to first end 14 by some convenient means, such as welding or riveting. Support 32, of any convenient form, is attached to lower surface 20.

Baffle 40, having closed end 42 and open end 44, is disposed within housing 12 (FIGS. 1, 2). Closed end 42 of baffle 40 is attached to bracket 30 by any convenient means. Baffle 40 may be welded to bracket 30, or attached by some other means such as rivets or bolts. Baffle 40 is substantially coaxial with housing 12.

Coil 50 is disposed about baffle 40 in spaced relation thereto. Preferably, coil 50 is spirally wound about baffle 40. Coil 50 has a diameter, pitch, inlets 56, 58 and outlets 60, 62. As best seen in FIG. 2, coil 50 is separated from baffle 40 by spacing 70, and from housing 12 by spacing 72. Coil 50 is at least partially filled with hydride 80.

In an example of a preferred embodiment of the present invention, housing 12 is a substantially cylindrical drum about 12" (30.5 cm) in diameter and 34.5" (about 87.6 cm) long. Baffle 40 is 8.6" (about 21.8 cm) in diameter and 27.8" (about 70.6 cm) long. Housing 12, bracket 30 and baffle 40 are preferably stainless steel. The dimensions of housing 12, bracket 30 and baffle 40 may, however, be varied as convenient.

The dimensions and configuration of coil 50 depend on the dimensions of housing 12 and baffle 40. If coil 50 is made longer, more separation occurs before the gas reaches outlets 60, 62 of coil 50, but the resistance of the relatively greater quantity of hydride 80 to gas flow in the longer coil is greater than in a shorter coil. If coil 50 is shortened, the quantity of hydride 80 it can hold may be insufficient to achieve the desired separation. Similarly, the diameter of coil 50 affects the amount of hydride 80 it can hold, the resistance of the hydride in coil 50 to the flow of gas therethrough, and the heat transfer between the fluid and the hydride. Generally, the larger the diameter of coil 50, the lower the gas flow rate per unit cross-sectional area of coil 50 and the slower the heat transfer. Thus, the optimum dimensions of coil 50 are best determined by a modest amount of computation and experiment for each particular apparatus 10. For the dimensions given above for housing 12 and baffle 40, coil 50 is 21' (about 6.4 m) long, with a diameter of 1.25" (about 3.2 cm). Coil 50 is spirally wound about baffle 50, separated from baffle 40 and housing 12 by spacings 70, 72 of 0.3" (about 0.8 cm) each. The pitch of coil 50 is about 1.5" (3.8 cm). Other than at inlets 56, 58 and outlets 60, 62, coil 50 contains no seams or welds. Seams or welds are avoided so as to give no opportunity for hydrogen to escape the system.

Coil 50 may include two segments, as shown in FIG. 1. In this configuration, a process gas enters coil 50 at inlet 56, proceeding to outlet 60 and inlet 58 before exiting coil 50 at outlet 62. If desired, additional process gas can be added to coil 50 at inlet 58, or monitoring or sampling equipment can be connected between outlet 60 and inlet 58. For example, inlets 56, 58 may be provided with thermowells for receiving temperature-monitoring apparatus. Alternatively, inlet 58 and outlet 60 may be omitted so that coil 50 is a single, seamless coil. If convenient, apparatus 10 may contain a plurality of concentric coils.

The components of apparatus 10, including housing 12, bracket 30, support 32, baffle 40, and coil 50 are preferably made of stainless steel. If preferred, other materials that are compatible with the hydride and the process gas can be used instead of stainless steel.

To remove hydrogen from a hydrogen-containing process gas mixture, the mixture is pumped from a source 82 into apparatus 10 at inlet 56 by a first pump 90. If convenient, additional process gas may be input at inlet 58. As the mixture is pumped by first pump 90 through coil 50, it contacts hydride 80. At least a portion, and preferably most of the hydrogen in the mixture is absorbed by hydride 80, so that largely hydrogen-free gas exits outlet 62.

As the temperature of hydride 80 rises, the hydrogen equilibrium pressure also increases, so hydride 80 absorbs progressively less hydrogen. To maintain absorption, hydride 80 is cooled by pumping a fluid from a source 92 with a second pump 94 through a cooler/heater 96 causing it to flow from source 92 over coil 50. The fluid enters housing 12 via fluid inlet 22, is diverted by baffle 40 to flow over coil 50, and exits housing 12 via fluid outlet 24. Fluid flow is confined to the region between baffle 40 and housing 12, where rapid flow facilitates efficient heat transfer from hydride 80 and coil 50 to the fluid. Therefore, spacing 70 between coil 50 and baffle 40, and spacing 72 between coil 50 and housing 12, are preferably small enough for turbulent flow and efficient heat transfer, but large enough not to restrict fluid flow and slow heat transfer. For the dimensions given above for housing 12, baffle 40 and coil 50, spacings 70, 72 are each about 0.3" (0.76 cm). It will be evident to one of ordinary skill that the optimum spacings 70, 72 depend on the particular dimensions of the components of apparatus 10.

In contrast to absorption, hydrogen desorption is an endothermic reaction. To release hydrogen from hydride 80, fluid is heated by cooler/heater 96 and pumped over coil 50. Thus, whether apparatus 10 is operated in hydrogen-absorption or hydrogen-desorption phase is determined by regulating its temperature with cooler/heater 96: raising and lowering the temperature of the fluid so it cools hydride 80 for absorption and warms hydride 80 for desorption.

The fluid used to regulate the temperature of hydride 80 is preferably nitrogen, but may be any other convenient stable, gas or liquid that does not react with hydride 80, the process gas or the materials of apparatus 10, such as one of the inert gases, and can efficiently transfer heat in the desired operating temperature range. As will be evident, the viscosity of the fluid must be such that it flows well in that temperature range. The temperature of the fluid depends on the choice of hydride 80 and whether apparatus 10 is operating in the absorption or desorption phase of the cycle. The larger the temperature difference between the fluid and hydride 80, the better heat transfer therebetween and the more effective the absorption/desorption process.

Hydride 80 is any suitable hydride, hydride composition or packing material having a hydride-forming metal deposited into a substrate. To increase the efficiency of hydrogen absorption/desorption, the surface area of hydride 80 is maximized by supplying hydride 80 in the form of small, porous particles or pellets. For many hydrides, the particle size is reduced with each absorption/desorption cycle until eventually the particles disintegrate into a fine-grained powder. The powder is a poor heat conductor and tends to compact so that gas does not readily flow through it, reducing the efficiency of the process. Furthermore, the powder can readily become entrained in the gas stream, migrating with it and causing contamination of downstream piping and equipment. Therefore, hydride 80 is preferably a granular, dimensionally-stable composition.

It is well known that hydrides preferentially absorb all three isotopes of hydrogen, and most hydrides also differentially absorb the three isotopes of hydrogen (protium, deuterium, and tritium). Depending on the particular choice of hydride particles 80 placed in coil 50, apparatus 10 can be used to recover hydrogen from a hydrogen-containing gaseous mixture or to separate hydrogen isotopes (protium, deuterium and tritium) from each other. To recover hydrogen from a gaseous mixture, a low pressure hydride such as palladium, uranium or titanium is placed in coil 50. To separate hydrogen isotopes, a hydride with strong isotopic effects, such as palladium, vanadium or a lanthanum-nickel-aluminum alloy, is used. A hydride is said to have an isotopic effect if it differentially absorbs the three isotopes of hydrogen.

Apparatus 10 is operated in a temperature cycling process. Each temperature cycle consists of a cooling, or separation, phase and a heating, or regeneration, phase. In the cooling phase hydride 80 is cooled to a low temperature by circulating a low temperature fluid over the exterior of coil 50. In the heating phase hydride 80 is heated to a high temperature by circulating a high temperature fluid over coil 50. The faster the temperature is cycled, the better is the separation efficiency. An apparatus 10 according to this invention can cycle the temperature quickly, therefore it gives excellent separation efficiency.

To separate hydrogen from a gaseous mixture, the mixture is pumped through coil 50 from inlet 56 to outlet 62 in the cooling phase of the separation cycle. As the gaseous mixture passes through coil 50, it contacts hydride 80. At least a portion, and preferably most of the hydrogen in the mixture is absorbed by hydride 80, and nearly hydrogen-free gas is withdrawn from coil 50 at outlet 62. The cooling phase ends when the hydrogen absorption capacity of hydride 80 is saturated. Next, in the heating phase of the cycle, the hydrogen is desorbed from hydride 80 and collected at outlet 62 of coil 50.

To separate hydrogen isotopes from each other, hydride 80 is one of two types of hydride. The first type, such as palladium, absorbs the lighter hydrogen isotopes better than the heavier isotopes, that is, it absorbs protium better than deuterium and tritium, and deuterium better than tritium. This type of hydride is used to separate heavier isotopes from lighter isotopes, such as tritium from protium and deuterium, or deuterium from protium.

The second type of hydride, such as vanadium, absorbs the heavier isotopes better than the lighter isotopes, that is, it absorbs tritium better than deuterium and protium, and deuterium better than protium. This second type of hydride is used to separate the lighter isotopes from the heavier isotopes, such as protium from deuterium and tritium, and deuterium from tritium.

For example, to separate tritium from a mixture of tritium and protium, hydride 80 is the first type of hydride, such as palladium or the stable hydrogen-absorbing composition described in commonly assigned and recently issued U.S. Pat. No. 5,248,649 titled Palladium/Kieselguhr Composition and Method. The composition is made by immersing a porous substrate such as kieselguhr in a concentrated solution of tetra-amine palladium (11) nitrate. Palladium from the solution is deposited onto the substrate, which is then removed from the solution, dried, and calcined. This process is repeated until the desired amount of palladium has been deposited onto the substrate. Finally, the composition is heat treated to ensure reduction of the palladium to metal.

First, in the cooling phase of the cycle, a quantity of the mixture equal to about half or less of the hydrogen absorption capacity of the hydride in coil 50, is fed through inlet 56 into coil 50. Hydride 80, in the form of palladium particles or some other convenient hydride of the first type described above, tends to absorb the lighter protium before it absorbs the heavier tritium. Therefore, more of the protium is absorbed by hydride 80 near inlet 56 of coil 50 than is absorbed near the farther end, near outlet 62. The opposite occurs for the tritium, as more of tritium is absorbed at the farther end of coil 62, near outlet 62, than is absorbed near inlet 56.

Next, a quantity of protium is added at inlet 56. The protium displaces the tritium that was absorbed by hydride 80 in the cooling phase of the cycle, and pushes the tritium progressively towards outlet 62 until all or most of the tritium is driven out of coil 50.

Finally, in the heating phase of the cycle, hydride 80 is heated to desorb the protium. The protium is collected at inlet 56 of coil 50 and saved in a holding tank or some other convenient storage device for use in the next cycle.

The palladium/kieselguhr composition described above is also effective in separating protium (H) from deuterium (D), and in separating molecular hydrogen ($H_2$) from other gases. For example, apparatus 10 may be operated as described above to separate the heavier deuterium from the lighter protium in a mixture containing 50 vol. % of each isotope. In the cooling phase of the cycle, more of the protium is absorbed by the hydride composition near inlet 56 and more of the deuterium is absorbed near outlet 62 of coil 50. Protium is added to coil 50 at inlet 56 to displace the absorbed deuterium, whereupon a first product containing over 99.9 vol. % deuterium exits coil 50 at outlet 62. Coil 50 is then heated to desorb the protium, yielding a second product containing over 99.9 vol. % protium. Similarly, a mixture of 20 vol. % $H_2$ and 80 vol. % other gases such as $N_2$ can be separated into a first product containing over 99.9 vol. % $H_2$ and a second product containing less than 0.2 vol. % $H_2$.

To separate a lighter hydrogen isotope from heavier isotopes, coil 50 is filled with a hydride such as vanadium which absorbs the heavier isotopes better than the lighter isotope. The operation cycle is otherwise the same as that described above for separating a heavier isotope from the lighter isotopes.

If desired, two such apparatus 10, the first for separating a heavier isotope and the second for separating a lighter isotope, may be coupled to produce high purity heavier isotopes and high purity lighter isotopes at the same time. The separation factor of the system, or the ratio of unabsorbed gas to the ratio of absorbed gas per cycle, is constant for each particular apparatus 10. Therefore, the achievable degree of separation depends on the number of cycles. Separations of up to 99.999% can be obtained by operating apparatus 10 for a sufficient number of cycles.

It will be apparent to those skilled in the art that many changes and substitutions can be made to the preferred embodiment herein described without departing from the spirit and scope of the present invention as defined by the appended claims.

What is claimed is:

1. An apparatus for separating a hydrogen isotope from a gaseous mixture, said apparatus comprising:
    a housing having an inlet and an outlet;
    a conduit disposed within said housing, said conduit having an interior and an exterior, and an inlet and an outlet;
    particles of a hydride carried in said interior of said conduit, said hydride particles having a first temperature;
    a fluid in said housing and adjacent said exterior of said conduit, said fluid having a second temperature, said second temperature different from said first temperature; and
    means in spaced relation to said exterior of said conduit for creating turbulent flow of said fluid over said conduit so that said fluid can exchange heat with said hydride particles for adsorbing and desorbing said hydrogen isotope.

2. The apparatus as recited in claim 1, wherein said creating means is a cylindrical baffle in said housing.

3. The apparatus as recited in claim 1, wherein said creating means is a cylindrical baffle in said housing and said conduit is coiled around said baffle.

4. The apparatus as recited in claim 1, further comprising a pump for pumping said fluid through said housing from said inlet to said outlet of said housing.

5. The apparatus as recited in claim 1, further comprising a first pump for pumping a gaseous mixture through said conduit and a second pump for pumping said fluid through said housing over said exterior of said conduit.

6. The apparatus as recited in claim 1, further comprising means for raising and lowering said first temperature with respect to said second temperature.

7. The apparatus as recited in claim 1, wherein each hydride particle of said hydride particles comprises:
    a substrate; and
    palladium carried by said substrate.

8. An apparatus for separating a hydrogen isotope from a gaseous mixture, said apparatus for use with hydride particles and a fluid, said apparatus comprising:
   a housing;
   a conduit carried within said housing having an interior and an exterior, said conduit dimensioned for holding a quantity of hydride particles, said conduit formed into a coil;
   means for changing a temperature of a fluid when said fluid flows over said exterior of said coiled conduit; and means in spaced relation with said housing for causing said fluid to flow over said exterior of said coiled conduit so that heat energy can be exchanged between said fluid when said fluid is flowed over said exterior of said coiled conduit and said hydride particles are in said interior of said coiled conduit, said changing means comprising a baffle in spaced relation to said coiled conduit, said coiled conduit wound about said baffle, said baffle and said coiled conduit combining to confine said fluid and accelerate said fluid flow.

* * * * *